US012646361B2

(12) United States Patent
Kanagarajan et al.

(10) Patent No.: US 12,646,361 B2
(45) Date of Patent: Jun. 2, 2026

(54) GENERATING AND SECURELY TRANSFERRING AIRCRAFT MAINTENANCE AND OPERATIONS DATA

(71) Applicant: Honeywell International Inc., Charlotte, NC (US)

(72) Inventors: Sivakumar Kanagarajan, Bangalore (IN); Gobinathan Baladhandapani, Madurai (IN); Anand Kutuva, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 529 days.

(21) Appl. No.: 18/064,050

(22) Filed: Dec. 9, 2022

(65) Prior Publication Data

US 2024/0119760 A1 Apr. 11, 2024

(30) Foreign Application Priority Data

Oct. 5, 2022 (IN) .............................. 202211057103

(51) Int. Cl.
| | |
|---|---|
| *G07C 5/00* | (2006.01) |
| *G06F 16/21* | (2019.01) |
| *G06F 16/28* | (2019.01) |
| *G08G 5/20* | (2025.01) |

(52) U.S. Cl.
CPC ........... *G07C 5/008* (2013.01); *G06F 16/219* (2019.01); *G06F 16/285* (2019.01); *G07C 5/006* (2013.01); *G08G 5/20* (2025.01)

(58) Field of Classification Search
CPC ....... G07C 5/008; G07C 5/006; G06F 16/219; G06F 16/285; G06F 21/31; G06F 21/602; G08G 5/20; G08G 5/26; G08G 5/55; G08G 5/22; G08G 5/53; G06Q 10/04; G06Q 10/20
See application file for complete search history.

(56) References Cited

U.S. PATENT DOCUMENTS

| | | | |
|---|---|---|---|
| 6,915,189 B2 | 7/2005 | Igloi et al. | |
| 7,483,773 B1 | 1/2009 | Tripp | |
| 9,800,665 B2 | 10/2017 | Uczekaj et al. | |
| 2004/0086124 A1* | 5/2004 | Sasaki ................... | H04L 9/0866 |
| | | | 380/277 |

(Continued)

*Primary Examiner* — Anne Marie Antonucci
*Assistant Examiner* — Misa H Nguyen
(74) *Attorney, Agent, or Firm* — ALSTON & BIRD LLP

(57) ABSTRACT

A computer implemented method including: receiving a history database file and a public key of a public/private key pair from an external server; generating aircraft maintenance and operations data using one or more onboard sensors that are configured to sense one or more characteristics of aircraft maintenance and operations systems; classifying the generated aircraft maintenance and operations data as selected data and unselected data based on a comparison of the sensed aircraft maintenance and operations data with stored aircraft maintenance and operations data of a trained aircraft data model; storing the selected data in the received history database file; encrypting the received history database file using the received public key of the public/private key pair to generate an encrypted history database file including selected data; transmitting the encrypted history database file including the selected data to an external server.

13 Claims, 7 Drawing Sheets

(56) References Cited

U.S. PATENT DOCUMENTS

| 2017/0111176 A1* | 4/2017 | Angus | H04L 63/0823 |
| 2017/0187539 A1* | 6/2017 | Thompson | H04W 12/068 |
| 2018/0288080 A1* | 10/2018 | Keller | H04L 63/1425 |
| 2020/0151967 A1* | 5/2020 | Boggio | G07C 5/006 |
| 2021/0319633 A1* | 10/2021 | Korchev | B64D 45/00 |

\* cited by examiner

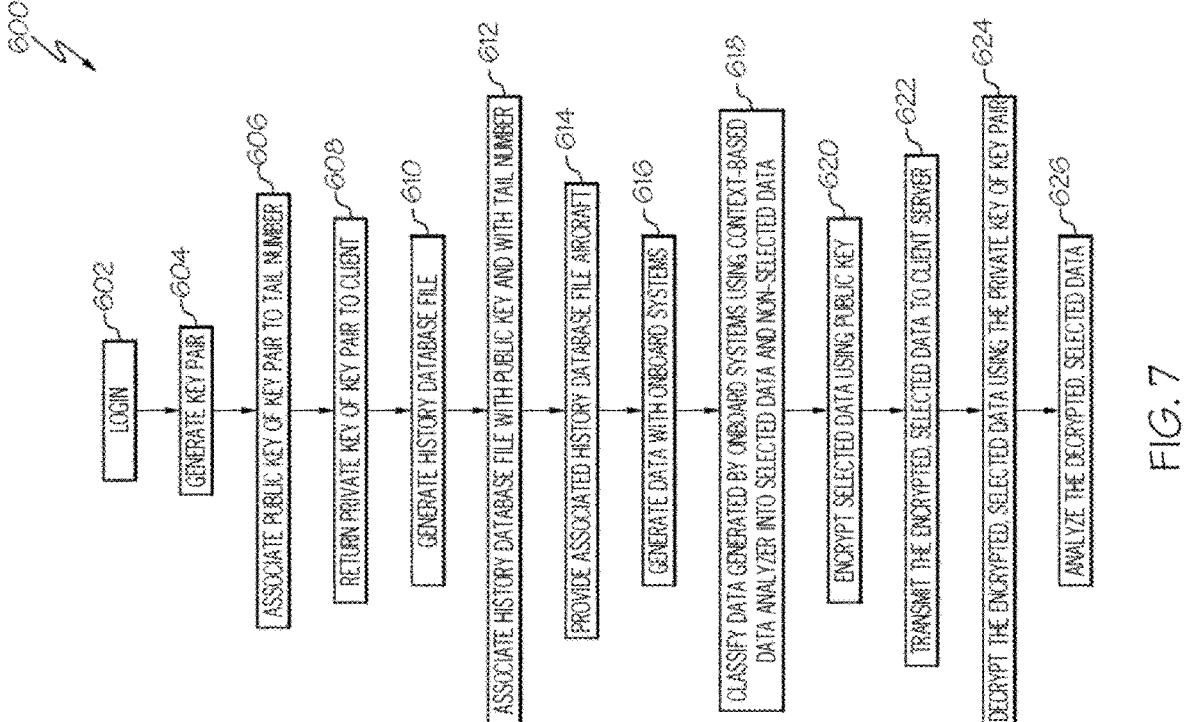

602 LOGIN

604 GENERATE KEY PAIR

606 ASSOCIATE PUBLIC KEY OF KEY PAIR TO TAIL NUMBER

608 RETURN PRIVATE KEY OF KEY PAIR TO CLIENT

610 GENERATE HISTORY DATABASE FILE

612 ASSOCIATE HISTORY DATABASE FILE WITH PUBLIC KEY AND WITH TAIL NUMBER

614 PROVIDE ASSOCIATED HISTORY DATABASE FILE AIRCRAFT

616 GENERATE DATA WITH ONBOARD SYSTEMS

618 CLASSIFY DATA GENERATED BY ONBOARD SYSTEMS USING CONTEXT-BASED DATA ANALYZER INTO SELECTED DATA AND NON-SELECTED DATA

620 ENCRYPT SELECTED DATA USING PUBLIC KEY

622 TRANSMIT THE ENCRYPTED SELECTED DATA TO CLIENT SERVER

624 DECRYPT THE ENCRYPTED SELECTED DATA USING THE PRIVATE KEY OF KEY PAIR

626 ANALYZE THE DECRYPTED SELECTED DATA

GENERATING AND SECURELY TRANSFERRING AIRCRAFT MAINTENANCE AND OPERATIONS DATA

CROSS REFERENCE TO RELATED APPLICATIONS

This application claims the benefit of priority under 35 U.S.C. § 119 from Indian Provisional Patent Application No. 202211057103, filed Oct. 5, 2022, the entirety of which is incorporated herein by reference.

TECHNICAL FIELD

The present disclosure relates generally to the real time analysis and secure migration of aircraft generated data, and more specifically to migrating aircraft generated data to a land based server using two-factor authentication methods.

BACKGROUND

Due to their mobility, aircraft face difficulty transferring data quickly. Transferring data during flight using on board communication systems may be slow or even impossible or may be prohibitively expensive. Meanwhile, demands for data from both maintenance and operations systems increase as the capability to collect and utilize data makes flying safer and more efficient. Aircraft maintenance and operations data may even be required in real time. However, the number of systems capable of generating such data has increased, thus increasing the amount of aircraft data generated during a flight to a level that renders current onboard communication systems too slow or expensive to transmit such quantities of data. Especially when considered from a data security view point. Because airlines and other customers/clients may desire vast amounts of aircraft operations and maintenance data and for such data to be robustly protected, new systems and methods for providing real time analysis and secure migration of aircraft generated data are desired.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a computer implemented method of analyzing aircraft-generated data for criticality and sensitivity at a data gateway using a ground simulator-trained data analysis model includes: receiving a history database file and a public key of a public/private key pair from an external server; generating aircraft maintenance and operations data using one or more onboard sensors that are configured to sense one or more characteristics of aircraft maintenance and operations systems; classifying the generated aircraft maintenance and operations data as selected data and unselected data based on a comparison of the sensed aircraft maintenance and operations data with stored aircraft maintenance and operations data of a trained aircraft data model; storing the selected data in the received history database file; encrypting the received history database file using the received public key of the public/private key pair to generate an encrypted history database file including selected data; and transmitting the encrypted history database file including the selected data to an external server.

In another embodiment, a computer implemented method of analyzing aircraft-generated data for criticality and sensitivity includes: receiving a public and private key pair from an external server, the public and private key pair including a public key and a private key; associating the public key of the public and private key pair with a unique identifier, the unique identifier identifying a unique aircraft; generating a history database file and associating the public key of the public and private key pair with the history database file such that data filling the history database file is encrypted with the public key of the public and private key pair and associated with the unique aircraft; providing the history database file and the associated public key of the public and private key pair to the unique aircraft identified with the unique identifier; receiving an encrypted history database file from the unique aircraft, the encrypted database file having been encrypted with the public key of the public and private key pair; and providing the encrypted history database file to the external server for decryption using a private key of the public and private key pair.

In yet another embodiment, a system for analyzing aircraft-generated data for criticality and sensitivity at a data gateway using a ground simulator-trained data analysis model includes: at least one processing device and a memory storing machine-readable instructions, the instructions causing the processing device to: receive a history database file and a public key of a public/private key pair from an external server; generate aircraft maintenance and operations data using one or more onboard sensors that are configured to sense one or more characteristics of aircraft maintenance and operations systems; classify the generated aircraft maintenance and operations data as selected data and unselected data based on a comparison of the sensed aircraft maintenance and operations data with stored aircraft maintenance and operations data of a trained aircraft data model; store the selected data in the received history database file; encrypt the received history database file using the received public key of the public/private key pair to generate an encrypted history database file including selected data; and transmit the encrypted history database file including the selected data to an external server.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which:

FIG. 7 illustrates a method for generating and securely transferring aircraft maintenance data.

FIG. 8 illustrates another method for generating and securely transferring aircraft maintenance data.

FIG. 9 illustrates yet another method for generating and securely transferring aircraft maintenance data.

DETAILED DESCRIPTION

Figure 1:
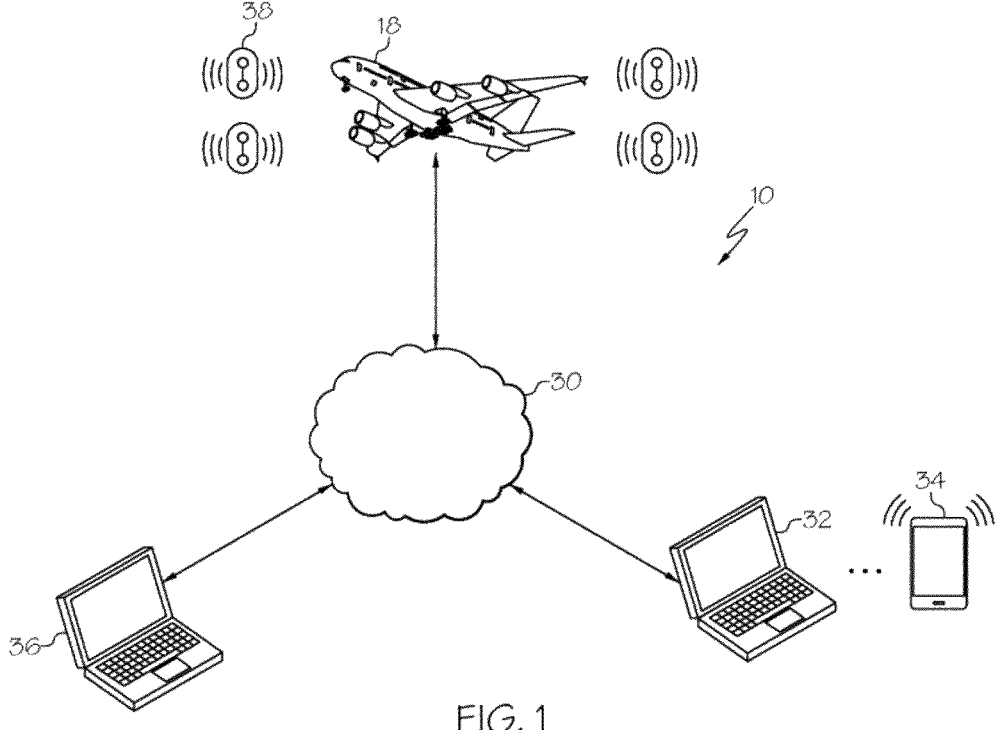
FIG. 1 illustrates an exemplary computing environment for generating and securely transferring aircraft maintenance data, according to one or more embodiments shown and described herein.

Referring to FIG. 1, a schematic depiction of a system 11 includes a network 12 for communicatively coupling an asset 18 (e.g., an aircraft or other vehicle) with one or more computing devices, such as the computing device 32, the mobile computing device 34, and the second computing device 36. The asset 18 may include a plurality (e.g., hundreds, thousands, etc.) of sensors 38 for sensing characteristics of the systems and processes aboard the asset 18 and a network including one or more computing devices for processing the output of sensors 38 and causing one or more actions based on the output of the sensors 38. The sensors 38 can include, for example, flow sensors, pressure sensors, temperature sensors, altimeters, airspeed indicators, position sensors, oxygen sensors, force/vibration sensors, compasses and magnetometers, gyroscopes, altitude heading and reference systems, tachometers, communications equipment, navigation equipment, systems monitoring equipment, control systems monitoring equipment flight recorders, weather sensors, and other sensors associated with an aircraft and/or aircraft support systems.

Figure 2:
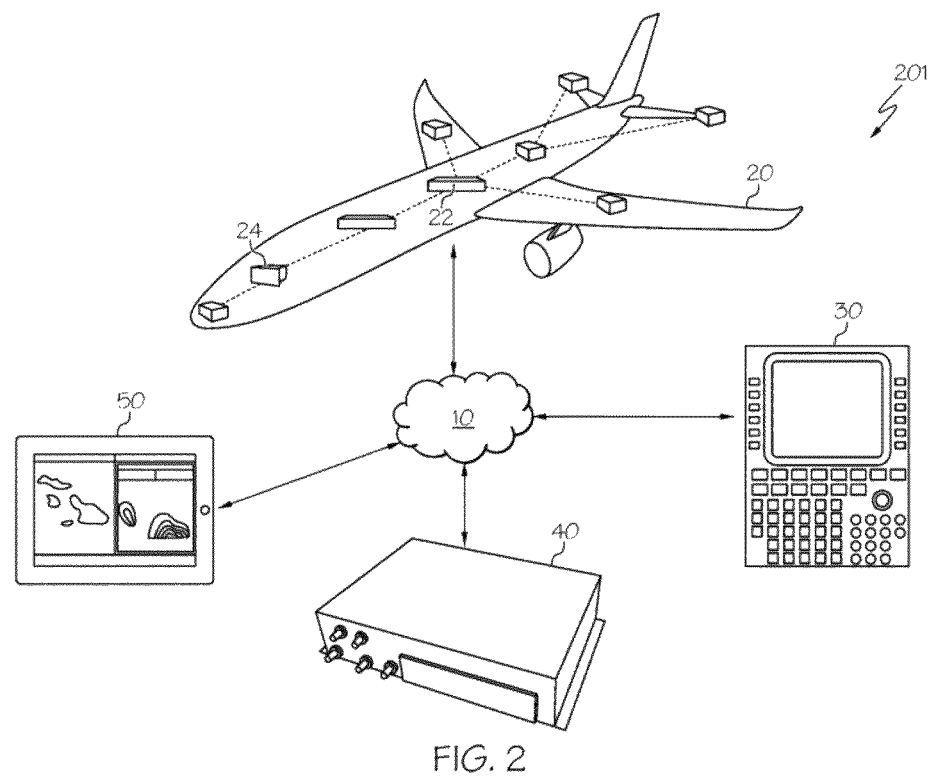
FIG. 2 illustrates depicts an exemplary aircraft-based network system architecture for the asset of FIG. 1.

Referring to FIG. 2, a network environment embodied as system 201 for context-based display of cockpit simulation is shown. The network environment includes an aircraft 20 (which may be similar to the asset 18 of FIG. 1), which may include an aircraft-based data gateway ("ADG") 22 that may couple to a plurality of avionics line-replaceable units (LRU) 24, one or more flight management systems (FMS) 30, one or more network routers 40, one or more personal electronic devices (PED) 50, and other systems. The various systems may connect to a data network 10 (e.g., a cloud network, the network 12 of FIG. 1, etc.) via one or more communications systems aboard the aircraft 20 (e.g., a SATCOM system, an HF communications system, a VHF communications system, a FOMAX/AoIP system, etc.)

The ADG 22 may enable real-time wireless distribution of databases, loadable software, flight data, and passenger traffic enhancing aircraft and flight efficiencies, and may enhance connections to electronic flight bag (EFB) applications for pilots from ground servers, for example, while the aircraft 20 is grounded or via SATCOM or other communications devices while in flight. The EFB may be displayable on the PED 50 in a customizable display and may include, for example, one or more charts, graphs, data related to the operation of the aircraft, and/or regulatory requirements associated with operating the aircraft. The ADG 22 may be, for example, a single unit or multiple units that act as a gateway for all data that flows into and out of the aircraft. The ADG 22 may connect the EFB to aircraft systems and parameters to further enable applications as described herein.

The one or more LRUs 24 may be one or more modular components that may be designed to be replaced quickly at an operating location (e.g., a first line). Each avionics LRU 24 may be a sealed unit such as, for example, a radio, a radar, a sensor, a traffic control unit, a weather unit, or other auxiliary equipment that can be stocked and replaced quickly to restore a mobile systems to service. The avionics LRUs 24 may include communications, navigation, display and management systems, and any other of the various systems that are fitted to an aircraft to perform individual functions. The avionics LRUs may assist with and provide crews access to systems enabling, for example, published routes and procedures for improved navigation and routing, negotiated trajectories thus adding data communications to create preferred routes dynamically, delegated separation for enhanced situational awareness in the air and on the ground, low visibility/ceiling approach/departure for enabling operations with weather constraints with less ground infrastructure, surface operations to increase safety in approach and departure, and air traffic management (ATM) efficiencies to improve the ATM process.

The FMS 30 may be a specialized computer system that may automate various in-flight tasks. One function of the FMS 30 may be, for example, to manage the flight plan for any given flight. The FMS 30 may receive input from various sensors and systems (not shown), such as, for example, a GNSS system, an INS system, a radio navigation system, etc. to determine the aircraft's position. Using the sensors and systems, the FMS 30 may guide the aircraft along a given flight plan (e.g., to New York from Amsterdam). The FMS 30 may be controlled, for example, through a Control Display Unit (CDU) which CDU may be located at one or more locations throughout the aircraft (e.g., in a cockpit) and may incorporate various input/output devices (e.g., a small screen and keyboard and/or touchscreen). In some embodiments, a digital clone of one or more systems of the FMS 30 (e.g., the CDU) may be reproduced at the PED 50 as a cloned cockpit or other digital clone based on an avionics engine stored in the network 10 and/or the PED 50. The FMS 30 may send a flight plan for display to an Electronic Flight Instrument System (EFIS), Navigation Display (ND), or Multifunction Display (MFD), which systems and displays could be displayed and manipulated using, for example, an input/output device (e.g., in the cockpit 10) or on the PED 50 from anywhere with a connection to the network 10. In some embodiments, even when the PED 50 is not connected to the network 10, it may save one or more changes locally and upload the changes to the network 10 upon connection to the network 10. In some embodiments, the FMS 30 may include, as one example, a flight management computing device, a control display unit, and a cross talk bus.

Still referring to FIG. 2, the FMS 30 may be communicatively coupled to a flight data system (FDS), which FDS may include, for example, one or more gateways that are configured to receive data from one or more aircraft systems (e.g., a radar system, an engine system, an auxiliary power unit, wheel systems, brake systems, navigation, collision avoidance, flight recorders, automatic traffic control systems, etc.) and sensors (e.g., the sensors 18 of FIG. 1 including one or more flow sensors, pressure sensors, temperature sensors, altimeters, airspeed indicators, position sensors, oxygen sensors, force sensors, vibration sensors, compasses, magnetometers, gyroscopes, altitude heading sensors, tachometers, etc.) to record data generated by the aircraft during flight. The FDS can include one or more modules configured to enact one or more of its processes.

For example, the FDS may include a network server platform, a network server device manager, an action handler module, a domain analytic applications module, a data store, a cloud connector module, a rules engine module, a bus management module, a node agent module, a data ingress/egress module(s), an edge analytics software development kit (SDK), a data bus, and one or more software API modules (e.g., a python API, a Linux API, etc.) The FDS may acquire, record, download, and analyze data in order to make one or more recommendations to the operators of the aircraft in real time.

The network router(s) 40 may be distributed throughout an aircraft in a distributed architecture which can provide optimum coverage through a cabin and flight deck and provide redundancy to the various devices and systems throughout the cabin and flight deck. The network router(s) 40 may be compatible with a range of satellite communications systems including satellite networks. The network router(s) 40 may be configurable to work as a router, wireless access port, data loader, and/or EFB connection.

The PED 50 may include and/or be communicatively coupled to one or more processors and memories storing instructions that are configured such that the PED can host applications that enable a crew of the aircraft 20 to perform functions associated with operating the aircraft 20. For example, using the EFB applications on the PED 50, the crew may perform basic through advanced flight planning calculations and display various documentation, including navigational charts, operations manuals, and aircraft operational and administrative checklists. The EFBs for use with the PED may be certified as part of the aircraft avionics system(s) operating on board the aircraft 20 and may be integrated with the aircraft systems such as the FMS 30 such that input to one avionics systems can be used to update the others and vice versa. The PED 50 can receive, for example, one or more inputs from a position tracking system (e.g., GNSS) to be used in flight or while on the ground to display an aircraft's position on navigational charts. The PED 50 can depict real-time weather information based on one or more connections to a weather system. In some embodiments, the PED 50 may be one or more of a tablet device, a mobile computing device (e.g., a smartphone), and/or a virtual reality (VR) headset.

Figure 3:
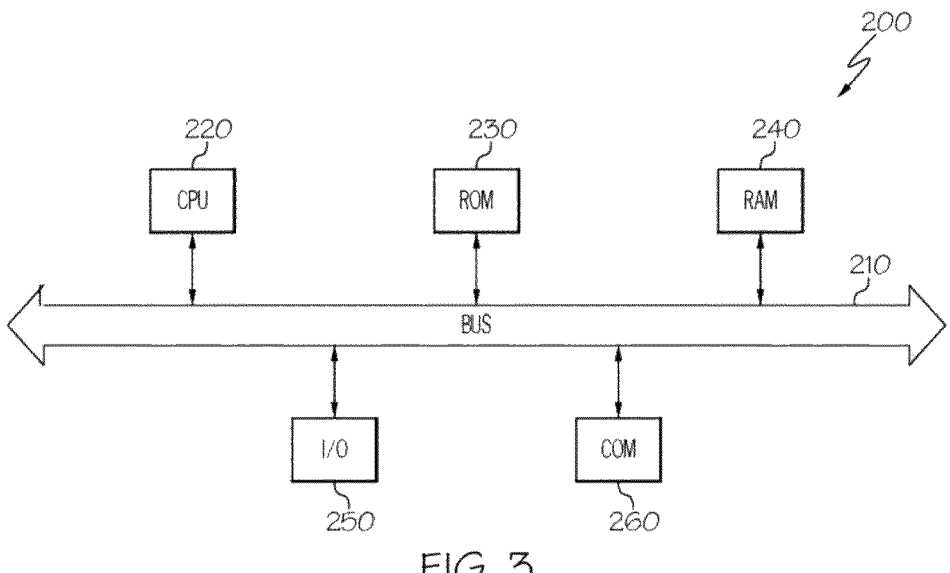
FIG. 3 illustrates a system environment for generating and securely transferring aircraft maintenance data.

FIG. 3 shows a simplified functional block diagram of a computing system 200 that may be configured for carrying out one or more of the steps, programs, and/or executing techniques described herein, according to exemplary embodiments of the present disclosure. Specifically, in one embodiment, any of the modules of the computing devices 32, 34, 36 of FIG. 1 or the computing devices 32, 34, 36 themselves may be an assembly of software and/or hardware including, for example, a data communication interface 260 for packet data communication. The platform may also include a central processing unit ("CPU") 220, in the form of one or more processors, for executing program instructions. The platform may include an internal communication bus 210, program storage, and data storage for various data files to be processed and/or communicated by the platform such as ROM 230 and RAM 240, although the system 200 may receive programming and data via network communications. The system 200 also may include input and output ports 250 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

FIG. 3 and the following discussion provide a brief, general description of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Figure 4:
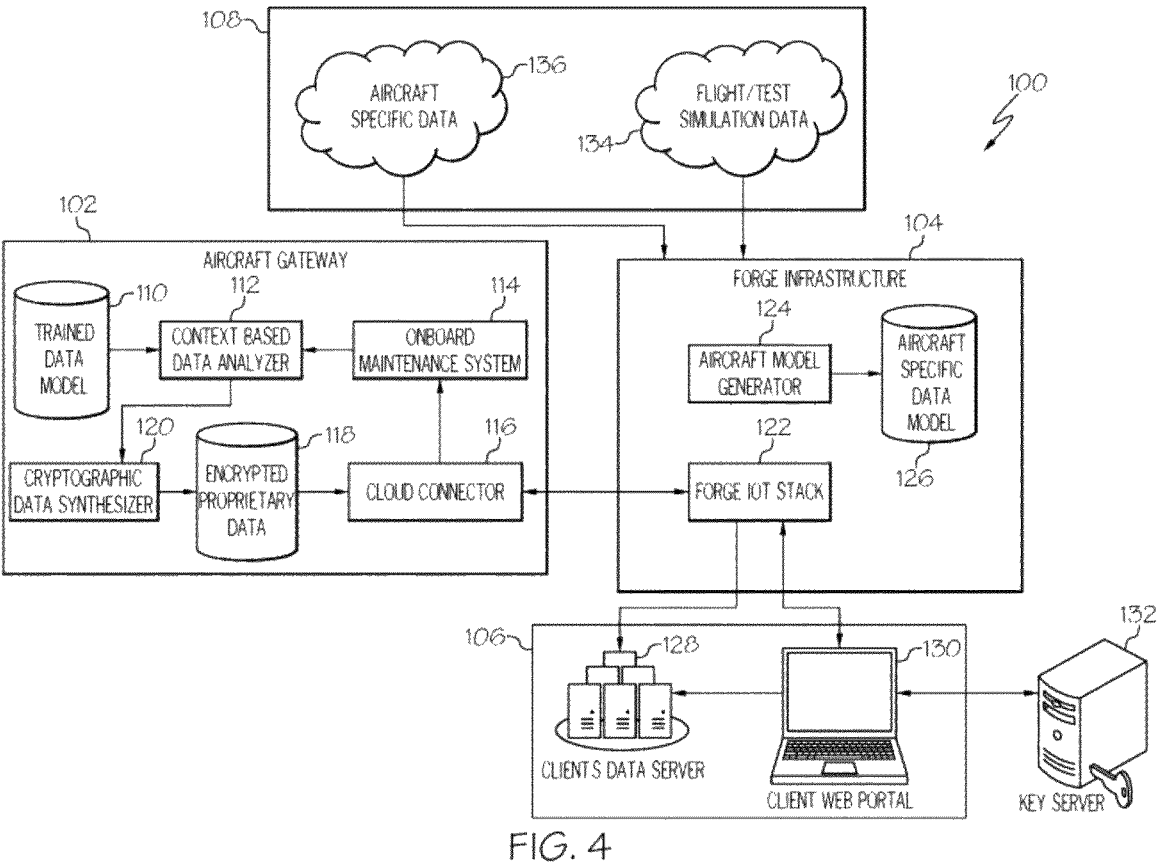
FIG. 4 illustrates an exemplary computing environment including an aircraft gateway and a cloud-based network server.
Figure 5:
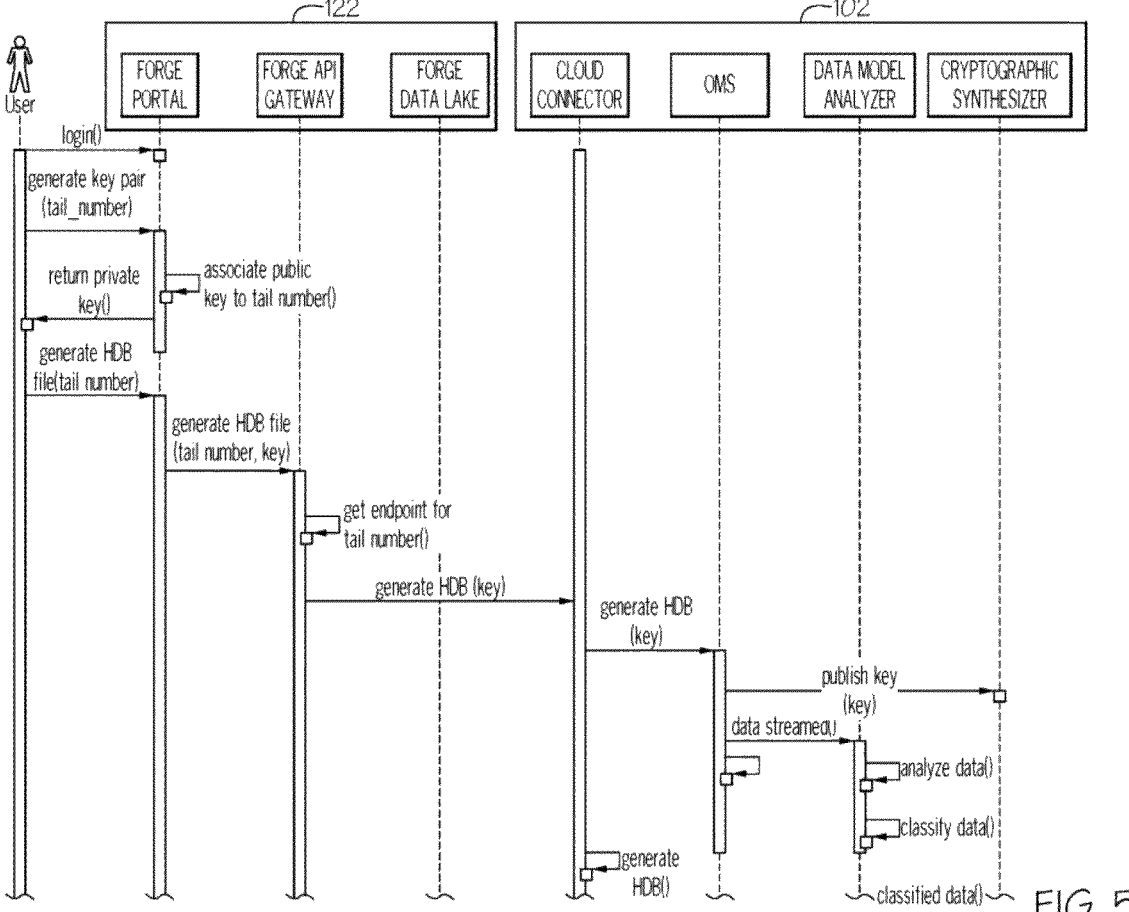
FIG. 5 illustrates an information flow for generating and securely transferring aircraft maintenance data.
Figure 6:
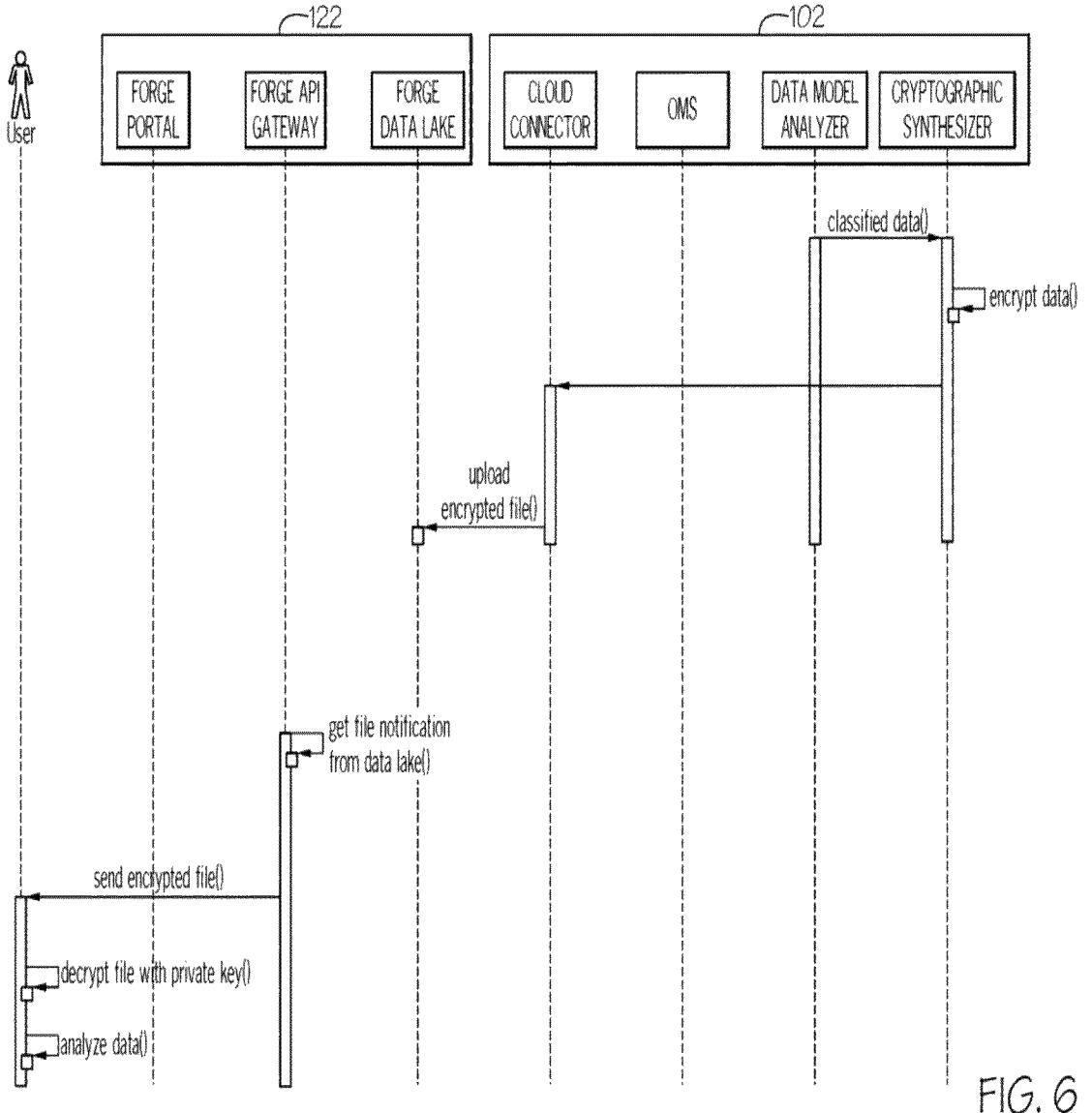
FIG. 6 illustrates a second portion of an information flow for generating and securely transferring aircraft maintenance data.

FIG. 4 shows a computing environment that enables a system 100 for generating and securely transferring aircraft maintenance and operations data (which may be referred to simply as "aircraft data" throughout the specification for convenience). The aircraft data may be information generated by the one or more onboard systems 38, which may be communicatively coupled to an onboard maintenance system as described herein. The system 100 may include an asset-based aircraft gateway 102, which may be equivalent or similar to the ADG 22 of FIG. 2 and may be configured to communicate with a ground-based network server 104. The network server 104 may be configured to further communicate with a network server 106 and to receive data from a test data server 108. One or more of the network server 104 and the network server 106 may be configured to communicate with a key server 132. The aircraft gateway 102 may include, for example, a trained data model 110, a context-based data analyzer 112, an onboard maintenance system ("OMS") 114, a cloud connector 116, an encrypted database 118, and a cryptographic data synthesizer 120. The network server 104 may include, for example, a network server stack 122, an aircraft model generator 124, and an aircraft model database 126. The network server 106 may include, for example, one or more client data servers 128 and a client web portal 130. The test data server 108 may include, for example, a set of aircraft specific data 136 and a set of flight/test simulation data 134.

The aircraft gateway 102 may enable two-way communication between external applications and on-board cockpit avionics. In the connected environment, the aircraft gateway 102 may be used for real-time updates to mission parameters from external applications and/or services such as EFB, Open World Computer (OWC), a Cloud application, and Airline Operational Control (AOC), for example, to improve the operational efficiency and safety of routine flight operations. The mission parameters may include information such as flight plan modifications, speed and/or altitude profile changes, wind and/or temperature information, cost index, or time constraints, for example. In some embodiments, the aircraft gateway 102 may The aircraft gateway 102 may be a computing environment (e.g., a server or group of servers) aboard the aircraft and may include one or more hardware- and/or software-based computing systems such as the computing system described above with respect to FIGS. 1 and 2. Within the computing system, the aircraft gateway 102 may store one or more trained data models, for example, in a trained data model database holding one or more trained data models 110. In some embodiments, the trained data model 110 may receive trained data model(s) from the aircraft specific data model database 126 before the aircraft deploys and/or during flight. The trained data model(s) may be trained using an initial set of data upon which the trained data model may define and refine an initial and subsequent sets of rules that may model aircraft maintenance and operations and may be used to provide simulated maintenance and operations data to the context-specific data analyzer 112 such that the context-specific data analyzer 112 can analyze real time operations and maintenance data generated by the asset on which the aircraft gateway 102 is deployed, which real time operations and maintenance data may be supplied by, for example, the OMS 114. The cloud connector 116 may be a software module that enables the coupling of the aircraft gateway 102 with one or more external computing systems, for example, the network server 104. The encrypted database 118 may be a data store or data lake for storing encrypted data that is generated by the systems onboard the asset 18 and encrypted using a key of a client such that only the client can access the encrypted data once it has been transferred from the asset to a system accessible by the client, for example, the client web portal 130.

The aircraft gateway 102 may include, for example, a failsafe validation engine hosted in the aircraft gateway 102. The failsafe validation engine may include a rule base and domain-specific computational logic for validating data uploads to one or more line-replaceable units (LRU) in the avionics. The failsafe validation engine may act as a filter mechanism to eliminate unintended or inconsequential data uploads from external applications and/or services to the avionics. For example, for a flight level change request from an EFB, the failsafe validation engine may validate the requested flight level against the maximum altitude that the aircraft can fly based on the current configuration. The maximum altitude may be obtained from the avionics, and when the requested flight level from the EFB is greater than the obtained maximum altitude, the request may be rejected by the failsafe validation engine. When the requested flight level is less than the maximum altitude, the requested flight level may be uploaded to the avionics. Additionally, the failsafe validation engine may check the fuel or time saved due to the requested flight level. If the savings is not significant, such as below a threshold savings value, the failsafe validation engine may reject the requested flight level.

In some embodiments, the rules engine may receive updated rules from the context-specific data analyzer. For example, when the context-specific data analyzer determines that a current flight phase is "cruise," the updated rules may be to reject an incoming takeoff performance message, and accept an incoming landing performance message. Based on the updated rules, the rules engine may process input data, such as a takeoff performance message or a landing performance message, for example. Upon successful processing, the processed data may be sent to the schematic parser. For example, processed data in may be the landing performance message after the message has been successfully validated by the rule engine, and successful processing may be for any landing performance message when the flight phase is cruise. Only after each of the rules applicable for the landing performance message are satisfied will the processing become successful. Upon unsuccessful processing, the rule engine may send an error message in a notification. For example, unsuccessful processing may be the rule engine rejecting a takeoff performance message during cruise. As an example, the error message may be "takeoff performance cannot be modified during the flight."

The context-specific data analyzer 112 may receive trained aircraft model data from the trained data model database. The trained data may be platform-specific trained data which may be generated by, for example, the aircraft model generator 124 and may be uploaded to the aircraft 18 through the aircraft gateway 102. The trained model may be based on aircraft specific data 136 and/or flight/test simulation data 134. The trained model may provide exemplary data (i.e., a model) against which to test the data captured by the various sensors and systems 38 aboard the asset 18. In some embodiments, the trained model may be context specific based on an aircraft phase, such as, for example, a taxi phase, a takeoff phase, a climbing phase, a cruise phase (calm/turbulent/etc.), a descent phase, a landing phase. The data from the trained model may be used to determine whether data captured in real time from the onboard sensors 38 is out of bounds or otherwise indicating an abnormality or anomaly in the aircraft data (which may indicate corrective action is required, for example). For example, a servo measurement from an aileron controller may normally indicate between −3 and +3 degrees (e.g., zero degrees) from a center point during a cruising phase but may normally indicate between +30 and +20 degrees from a center point during a descent phase. The trained model may be configured such that, depending on the phase of the aircraft it provides appropriate data.

Additionally, the trained model may provide, for example, upper and lower limits for the data. The upper and lower limits of the data may be based on specifications or other technical and engineering requirements for a given aircraft platform, which specifications are generally not exceeded or never exceeded. For example, a lower and upper limits for a turbine stage outlet operating temperature may be 300-800 deg. F. Additionally, the trained model may provide, for example, normal operating parameters associated with normal operations of an aircraft. The normal operating parameters may identify the characteristics of data captured when the aircraft is operating at its normal condition or within its normal operating conditions. The normal operating parameters may be obtained, for example, based on data captured from many test flights or actual flights and/or from aircraft simulation data. As an example, a trained model may provide an upper and lower normal operating bound. For example, a lower and upper bound of a normal operating condition of the turbine stage outlet operating temperature may be 500-600 F. Not all aspects measured by the sensors and systems of the aircraft will have upper and lower limits or normal operating condition bounds. For example, a turbine speed may be 0 RPM at its lowest limit and/or a normal operating parameter for a turbine air inlet temperature may not have a lower limit due to the low air temperatures at which an aircraft may operate. These examples are provided merely for context and are not intended to be limiting.

The context-specific data analyzer 112 may receive mission and external context data from one or more of an LRU Broadcaster, an external data database, or another source. For example, the context-specific data analyzer 112 may receive mission and external context data. The mission and external context data may include, for example, flight phase and flight level obtained directly from an LRU. For example, the external data may include flight information region, weather, and traffic. As another example, the external database may be a repository of all the external context data received from multiple sources. For example, weather information may be received from multiple weather sources globally and stored in the external database. The context analyzer may process the mission data and external context data, and send updated rules to the rule engine based on the processed mission data and external context data.

As an example, a takeoff performance message may be sent to the aircraft during a climbing phase of a flight. Here, the EFB may send the takeoff performance message to the gateway with a request to update the avionics. The input processor may receive the message and decode the data into a data model to process the data. The input processor may send the data model to the failsafe validation engine. The context analyzer may update the mission data (the phase of the flight) rule engine of the failsafe validation engine. When the rule engine processes the data model from the input processor, the failsafe validation engine may reject the request from the EFB, and provide a notification that the takeoff performance message is out of context.

As another example, a route modification flight plan may be sent to the aircraft during a cruise phase of a flight. Here, the EFB may send the route modification flight plan message to gateway with a request to update the avionics. The input processor may receive the message and decode the data into a data model to process the data. The input processor may send the data model to the failsafe validation engine. The context analyzer may update the mission data (such as origin/destination, phase of flight, flight level, for example) of the failsafe validation engine. When the rule engine processes the data model from the input processor, the failsafe validation engine may process the request successfully and send the processed request to the schematic parser. The schematic parser may parse the processed data based on one or more schematics for the avionics, and upon successful parsing, may send the parsed data to the output processor. The output processor may encode the parsed data into a suitable format for the avionics and send to a respective LRU for processing.

The context-based data analyzer 112 may constantly or routinely analyze aircraft data provided by the OMS 114. In some embodiments, the data provided by the OMS 114 is measured along with a pre- and post-time series data. The pre- and post-time series data provides a look back and a look forward to enable analysis of data before and after an event. For example, if a data anomaly is registered (e.g., a turbine stage outlet temperature exceeding a normal operating bound) the unit of data captured by the particular sensor causing the anomaly may be analyzed for a particular period before and after the anomaly. For example, if the turbine stage outlet temperature as measured by thermocouple "x" exceeds 600 F at time=0, the turbine stage outlet temperature as measured by thermocouple "x" may be recorded for a time period t=−15 to 15 seconds to capture sufficient data to determine a trend with respect to the sensed value. The time period −15 to 15 is merely an example and any time period for setting the pre- and post-time series data could be set (e.g., 5 sec, 10 sec, 30 sec, 1 minute, etc.). The context-based data analyzer 112 analyzes all or a predetermined subset of the OMS data such that selected data can be presented for transmission from the aircraft in order that necessary corrective action can be taken based on receiving the selected data. As an example, if a turbine stage outlet temperature is exceeding a normal operating temperature, it may indicate that corrective maintenance is required on one or more systems associated with the turbine.

The parameters for what data is selected may be context-based themselves and/or may be set by a user of the system 100 based on the needs of the user. For example, whether a comparison of real time data with model data generates critical data for selection (i.e., "selected data") or not can be contextual based on multiple factors such as, for example, flight status. For example, altitude is not critical during a taxi phase but would immediately become critical during an ascent phase. Further, the normal operating bounds for altitude would change between an ascent phase, a cruising phase, and a descent phase. Based on the user selections and/or the flight context, the context-based data analyzer 112 may select the selected data and may provide it to the cryptographic data synthesizer 120 to encrypt in order to ensure the protection of the data.

The cryptographic data synthesizer 120 may synthesize a cryptographic version of the selected data. In embodiments, the cryptographic data synthesizer may encrypt the synthesized selected data using, for example, a public key of a client key pair held by a client. The client may maintain the private key of the client key pair, such that only the client can decrypt the message encrypted with the public key of the client key pair. In this way, the encrypted synthesized selected data can pass over a network external to the client network without being accessible on the external network. For example, the encrypted synthesized selected data could be transferred from the aircraft gateway 102 to the network server 104 to the network server 106, where it may then be decrypted for analysis by the client as will be explained in greater detail herein. In some embodiments, the cryptographic data synthesizer 120 may utilize a hardware accelerator to speed up the operations and reduce the burden on an application processing unit. In embodiments, the client key pair may be generated by the client itself, for example, using the key server 132. The public key of the client key pair could be shared with others, for example, an administrator or user of the network server 104. The cryptographic content will be signed by the data synthesizer so that the integrity of the maintenance data cannot be tampered with, and it can also prove that the maintenance data has been generated by a specific aircraft and ensures non-repudiation of the data.

In embodiments, the network server 104 may include, for example, the aircraft model generator 124. The aircraft model generator 124 may generate a comprehensive data model which may be used to (e.g., by the aircraft gateway 102) compare and thus analyze and classify aircraft maintenance and operates data based on the recommended ranges of data for a given aircraft phase discussed above. In addition to the aircraft phase, the data model may provide context-specific model data based on, for example, environmental conditions (e.g., air temperature, wind speed, lighting conditions, etc.), altitude, flight level data, wind data (e.g., tail wind, cross wind, etc.) In some embodiments, the aircraft model generator 124 may be configured such that the models can be updated periodically (e.g., routinely on a daily, weekly, monthly, etc. basis) based on manual and automated testing and/or validation scenario data. The data used to generate the aircraft models may be derived from various sources, such as, for example, flight test data, flight data recorder data from historic flights, test environment data, etc. In some embodiments, the network server 104 may store one or more programs, systems, and/or modules for training and updating new models based on aircraft types and other environmental conditions and may store such trained and updated models in an aircraft specific data model database 126.

The network server 106 may house the client data server 128 and the client web portal 130, either of which may communicate with the network server 104. The client web portal 130 may be, for example, a website specifically designed to gather information from diverse sources (e.g., the network server 104, the aircraft gateway 102, etc.), like emails, online forums and search engines, to bring the information together in a uniform way. The client web portal 130 may include one or more personal portals for users of the client web portal 130. The client data server 128 (or simply "external data server") may be an external data server to which only particular parties with valid access can access and manipulate data such that the client (or other external party) knows that the data generated with and stored on the data server is under its control.

The key server 132 may receive requests from the client or other entity via the network server 106 or another computer or network communicatively coupled to the key server 132 for one or more keys. In response to the request, the key server 132 may generate a public key and a public key certificate which may include entity information about the public key. For example, the client may request a key in order to encrypt data from a particular flight of an asset having a particular tail number. The key server 132 may generate a public key with a public key certificate that includes the particular tail number as entity information. Hence, the public key may be used to identify the information it will be used to encrypt as information that was generated by the maintenance and operation systems aboard the flight having the particular tail number. Using the generated public key, the client may generate its own private key and the public key and the private key may thus be a client key pair. The client may provide the client public key to the aircraft having the particular tail number for encrypting data using the cryptographic synthesizer 120 on board the particular aircraft but may keep the client private key known only to itself such that the information encrypted with the client public key can only be decrypted with the client private key, thus giving the client peace of mind to know that the data encrypted with the client public key on board the aircraft is only seen by client.

As briefly mentioned above, the test data server 108 may include, for example, a set of aircraft specific data 136 and a set of flight/test simulation data 134. The aircraft specific data 136 may store data with respect to a particular aircraft type and/or based on specific characteristics of a given aircraft (e.g., length, max/min velocity, wingspan, engine type, passenger capacity, etc.) The aircraft specific data may be retrieved from sensors onboard a number of past flights and/or from one or more public or private databases (e.g., an "aircraft characteristics database" maintained by, for example, the United States Federal Aviation Administration). The flight/test simulation data 134 may be a specific set of data derived from flight tests and simulations for a given aircraft, which may be used to simulate properties of an actual aircraft in order to test or simulate one or more of the functions of the system 100 described herein or other systems aboard aircraft.

Referring now to FIG. 7, a method 600 for securely generating and transferring aircraft maintenance and operations data ("aircraft data") is shown. The method 600 is merely exemplary and not intended to be limiting upon the scope of the claims listed below, which the skilled artisan will recognize as being implementable using one or more methods not explicitly listed herein but which methods may be within the scope of the listed claims.

At step 602, a user (e.g., a client, a customer, an admin, etc.) may login to an external server, such as the network server 106. The network server 106 may communicatively connect to the network server 104. At step 604, a public and private key pair may be generated, for example, using a key server 132. The key server 132 may be internal and external to one or more of the network server 104 or the network server 106. The public and private key pair may be an RSA key, for example.

At step 606, the public key of the public and private key pair may be associated with a tail number of a particular, unique aircraft within the network server 104, which network server may maintain a list or database of aircraft in order to track and conduct aircraft maintenance and aircraft operations. For example, the public key may be associated with a fixed-wing type of aircraft with a tail number of, for example, N123SP may associate "Fixed-wing November one two three sierra papa" with its public key. The aircraft may be associated within one or more of its specific systems within the network server 104 by identification with its tail number or other uniquely identifying information. For example, identifying data identifying each of the engines aboard the aircraft may be stored associated with the tail number or other unique information identifying the aircraft within a database on the network server 104. Hence, the maintenance and aircraft operations data associated with the aircraft itself and each of the individual systems aboard the aircraft can be tracked using the systems and methods described herein. Once the public key of the public/private key pair is associated with the unique aircraft, the private key may be returned to the external server at step 608 and a history database file ("HDB file") may be generated at step 610 for association with the public key at step 612. The history database file may be a file with one or more columns or stores for storing aircraft maintenance and operations data.

At step 614, the aircraft history database file, now associated with the public key which has also been associated with the unique aircraft via tagging the specific tail number of the aircraft or other aircraft identifying information may be provided to the aircraft identified with the unique identifier. The HDB file may be provided, for example, over the network 12. The HDB file may be used by the OMS 114 and may be populated by aircraft maintenance and operations data by, for example, the sensors 38 and systems aboard the aircraft. The HDB file, having been associated with the public key generated from the public/private key pair and the tail number or other identifying information associated with the particular aircraft upon which the data is generated is known to have come from the particular aircraft such that at step 616 as data is generated by the sensors 38 and systems aboard the aircraft, the generated data is attributable.

Still, the attributable data generated by the aircraft may be voluminous and may be sufficiently voluminous such that transfer from the aircraft while the aircraft is operating may be impossible and/or prohibitively expensive without some filtering of the generated data. Hence, at step 618, the generated data may be classified using a context-based data analyzer into selected data and non-selected data. The context-based data analyzer may separate data using, for example, one or more trained data models 110 as described herein. The selected data may be encrypted using the public key of the public and private key pair at step 620 such that it can only be decrypted with the private key, which is held by the user alone (e.g., on the network server 106). Hence, there may now be a file aboard the aircraft that includes a subset of maintenance and operations data, which subset was generated based on context supplied by a trained model file based on the information which may be useful to aircraft maintenance and operations teams on the ground or otherwise to timely track and perform aircraft maintenance and operations on the aircraft.

At step 622, the encrypted, selected data may be transmitted from the aircraft to the network server 104. The data may be transmitted, for example via the network 12 to which the aircraft may communicatively couple using, for example an SHF link, a satellite communications link, or some other appropriate data link. At step 624, the encrypted selected data may be decrypted at the network server 106 by the user (e.g., the client, customer, etc.) such that only the client has access to the data and the data can pass through the network server 104 without being accessible to any other entity. At step 626, the user may analyze the decrypted, selected data to improve aircraft maintenance and operational practices.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A computer implemented method comprising:

deploying a data gateway onboard to establish communication with an external server, wherein the data gateway stores at least a context-based data analyzer, a trained aircraft data model, and a cryptographic data synthesizer;

receiving by the data gateway, a history database file and a public key of a public/private key pair from the external server;

generating aircraft maintenance and operations data using one or more onboard sensors that are configured to sense one or more characteristics of aircraft maintenance and operations systems in real-time;

classifying by the context-based data analyzer, the generated aircraft maintenance and operations data as selected data and unselected data, wherein the classification is based on a comparison of sensed aircraft maintenance and operations data with recommended ranges of stored aircraft maintenance and operations data of the trained aircraft data model;

encrypting by the cryptographic data synthesizer, the received history database file using the received public key of the public/private key pair to generate an encrypted history database file including the selected data; and transmitting the encrypted history database file including the selected data to the external server.

2. The computer implemented method of claim 1, wherein the trained aircraft data model is trained based on platform-specific flight test data, flight data recorder data from one or more historic flights, and test environment data.

3. The computer implemented method of claim 1, wherein the trained aircraft data model is trained based on an aircraft phase, air temperature, wind speed, lighting conditions, flight level data, tail wind data, cross wind data, and environment data.

4. The computer implemented method of claim 3, wherein the aircraft phase includes one or more of taxiing, takeoff, climbing, cruising, descent, and landing.

5. The computer implemented method of claim 1, wherein the trained aircraft data model is based on one or more platform-specific normal operating parameters of a platform and the trained aircraft data model comprises upper and lower boundaries, wherein the upper and lower boundaries are determined by one or more maximum and minimum operating capabilities of the platform.

6. The computer implemented method of claim 1, further comprising storing the selected data in the received history database file.

7. The computer implemented method of claim 1, wherein the generated aircraft maintenance and operations data is classified as selected data and unselected data using the context-based data analyzer that hosts the trained aircraft data model and at least some of one or more aspects of the trained aircraft data model are platform-specific.

8. The computer implemented method of claim 1, wherein the public/private key pair is generated by an external key server and a private key of the public/private key pair is held by a client such that only the client can decrypt the encrypted history database file.

9. The computer implemented method of claim 8, wherein the public key of the public/private key pair includes a public key certificate which includes entity information about the public key.

10. The computer implemented method of claim 9, wherein the entity information includes a tail number of the aircraft that generates aircraft-generated data such that information encrypted using the public key can be identified as having been generated by the aircraft.

11. The computer implemented method of claim 1, wherein the external server is a client's data server controlled by a client and the client does not make the private key known to external entities, external to the client server, wherein the client is a user or a customer.

12. A system for analyzing aircraft-generated data for criticality and sensitivity at a data gateway using a ground simulator-trained data analysis model, the system comprising:

at least one processing device and a memory storing machine-readable instructions, the instructions causing the processing device to:

deploy data gateway onboard to establish communication with an external server, wherein the data gateway stores at least a context-based data analyzer, a trained aircraft data model, and a cryptographic data synthesizer;

receive by the data gateway, a history database file and a public key of a public/private key pair from the external server;

generate aircraft maintenance and operations data using one or more onboard sensors that are configured to sense one or more characteristics of aircraft maintenance and operations systems in real-time;

classify by the context-based data analyzer, the generated aircraft maintenance and operations data as selected data and unselected data, wherein the classification is based on a comparison of sensed aircraft maintenance and operations data with recommended ranges of stored aircraft maintenance and operations data of the trained aircraft data model;

store the selected data in the received history database file;

encrypt by the cryptographic data synthesizer, the received history database file using the received public key of the public/private key pair to generate an encrypted history database file including selected data; and transmit the encrypted history database file including the selected data to the external server.

13. The system of claim 12, wherein the trained aircraft data model is trained based on platform-specific flight test data, flight data recorder data from one or more historic flights, and test environment data.

* * * * *